Figure 1:
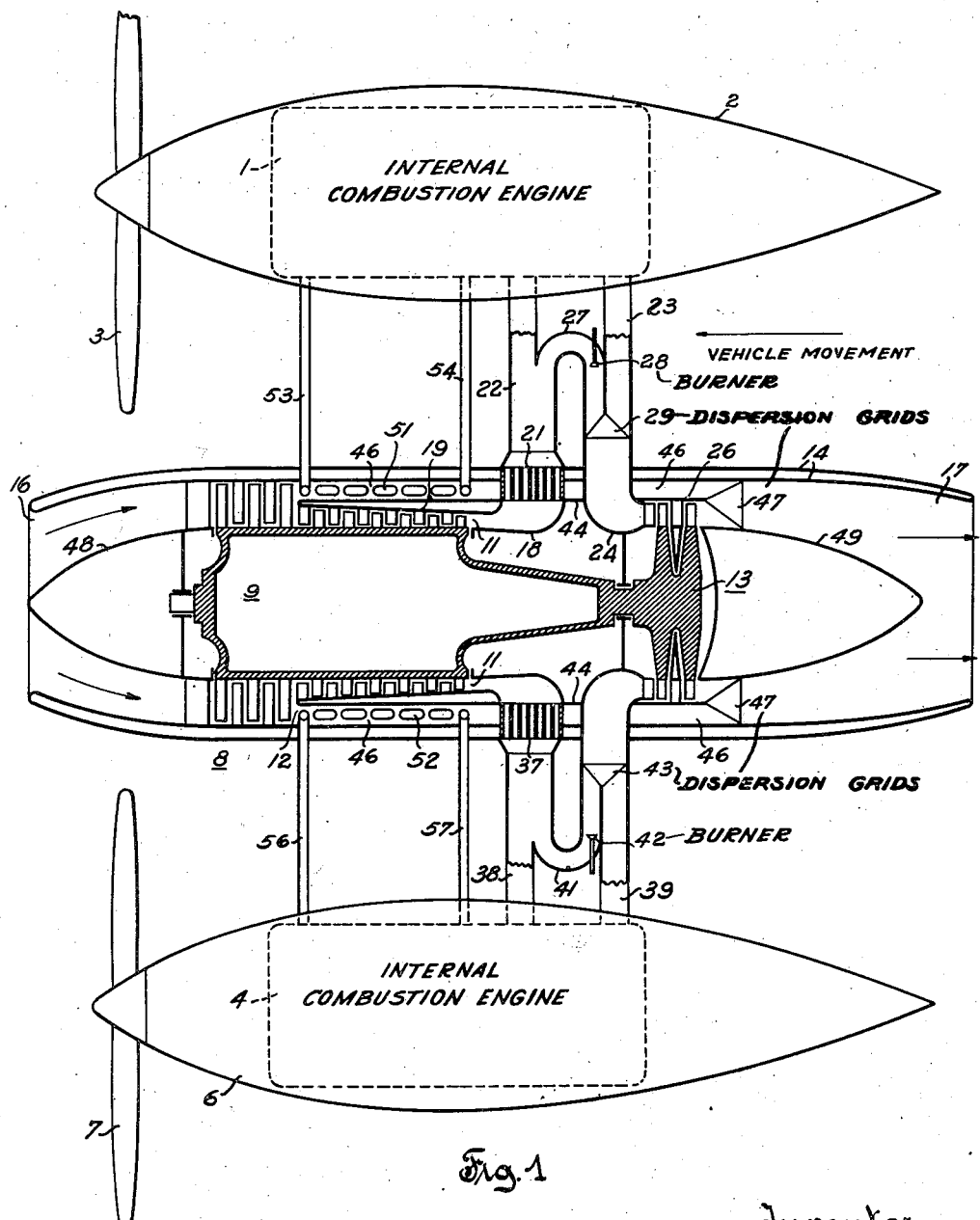

Patented Mar. 22, 1949

2,465,099

UNITED STATES PATENT OFFICE 2,465,099

PROPULSION MEANS COMPRISING AN INTERNAL-COMBUSTION ENGINE AND A PROPULSIVE JET

John Algot Johnson, Wauwatosa, Wis., assignor to Allis-Chalmers Manufacturing Company, Milwaukee, Wis., a corporation of Delaware Application November 20, 1943, Serial No. 511,157

6 Claims. (Cl. 60—35.6)

Ths invention relates particularly to the propulsion of vehicles adapted to be driven by the combined action of a propeller and one or more propulsive jets and has for its primary object the provision of a power plant embodying an internal combustion engine driving a propeller and a self-starting propulsive jet producing means correlated to more positively and better cool the internal combustion engine without introducing the cooling air drag inherently resulting when the engine and/or its radiator are cooled by movement of the vehicle through the surrounding air, to regain as momentum in the propelling jet some of the energy used in cooling the engine, to effect a material reduction in the weight-power ratio and to increase both the overall efficiency and the thrust effectiveness of the propelling jet or jets.

In accordance with this invention, one or more of the previously stated advantages may be readily attained in a power plant of the type herein specified by employing a propelling jet producing unit comprising a gas turbine, a compressor driven by the turbine and a nozzle structure for receiving and expanding the exhaust from the turbine and by employing a first conduit for conducting air discharged from the compressor into the engine, a second conduit for conducting the exhaust from the internal combustion engine to the inlet of the turbine, and means forming a passage for separately conducting relatively cold air discharged from the compressor directly to the nozzle structure, and by providing the internal combustion engine with a heat dissipating portion heat exchangingly associated with the relatively cold air stream flowing through the passage. In other words, the air delivered by the compressor is divided into two separate streams one of which is used for supercharging the internal combustion engine and the other of which cools a heat dissipating portion of the engine in passing directly to the propelling jet forming nozzle in which it is either mixed with the exhaust from the turbine and the mixture expanded to produce a single propelling jet or separately expanded thereby producing two propelling jets.

However, it is preferable, particularly for high altitude operation and for use with engines designed to operate with a high inlet manifold pressure, to provide separate high and low pressure air streams and to employ the high pressure stream for supercharging the internal combustion engine and the colder low pressure stream for externally cooling the engine as this results in better cooling and a higher overall propulsive efficiency for the unit.

Figure 2:
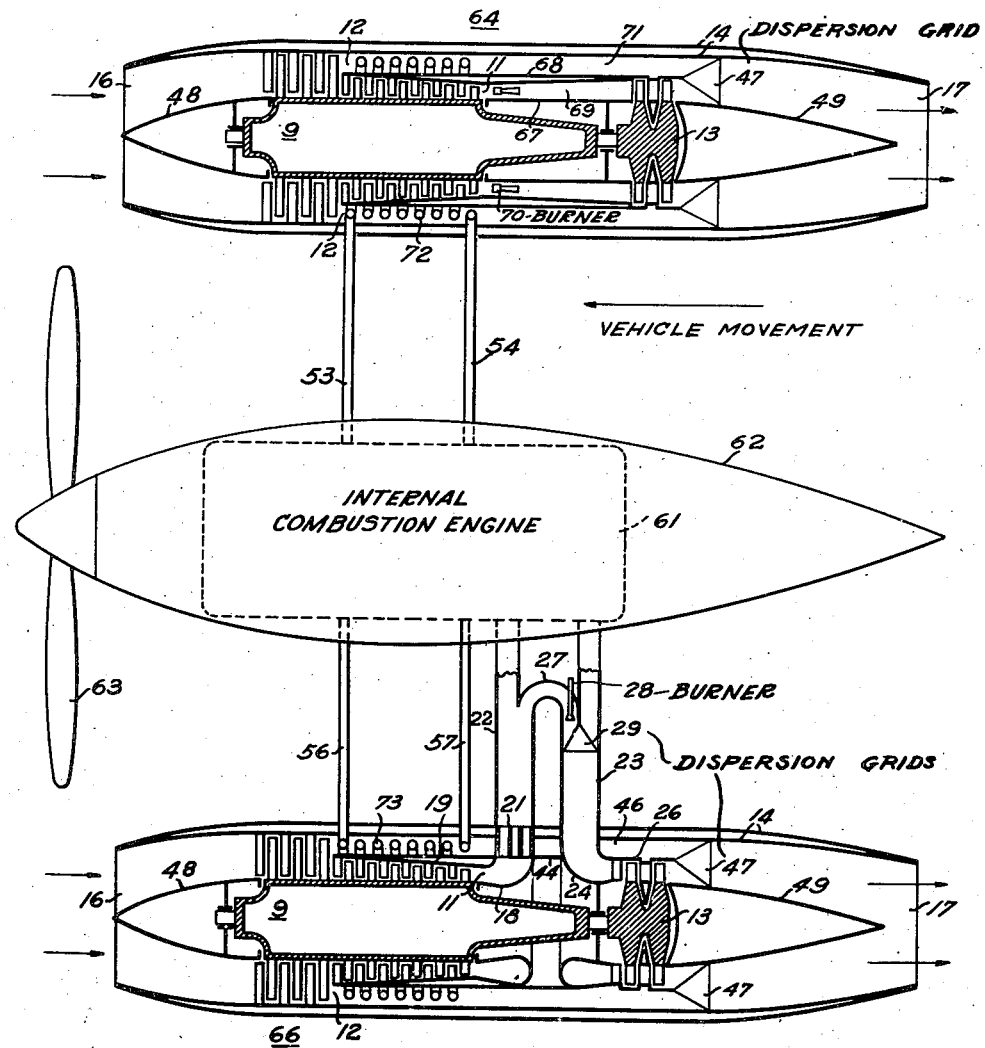
Figure 3:
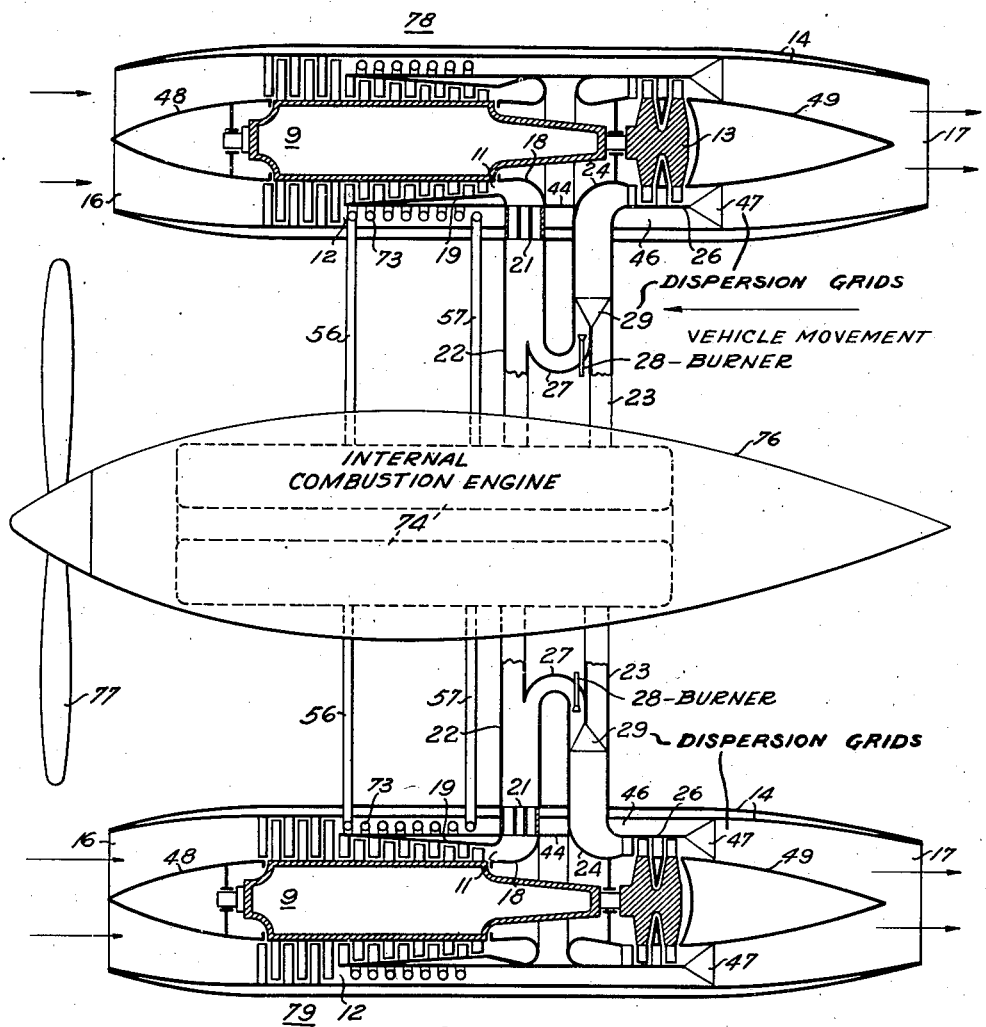

Accordingly, the invention consists of the various features of construction, combination of elements and arrangements of parts as is more fully set forth in the appended claims and in the detailed description, reference being had to the accompanying drawings, in which:

Fig. 1 schematically illustrates a power plant embodying the invention;

Fig. 2 schematically illustrates a modification of the power plant shown in Fig. 1; and Fig. 3 schematically illustrates a modification of the power plant shown in Fig. 2.

Referring particularly to Fig. 1, it is seen that a power plant embodying the invention may include a first fluid cooled internal combustion engine 1, an elongated nacelle 2 substantially enclosing engine 1 and having its longitudinal axis disposed in the general direction of vehicle movement indicated by the captioned arrow, a propeller 3 coaxially mounted at the forward end of nacelle 2 and driven by the engine 1 disposed within same, a second fluid cooled internal combustion engine 4, an elongated nacelle 6 substantially enclosing engine 4 and having its longitudinal axis also disposed in the general direction of vehicle movement and approximately parallel to the longitudinal axis of nacelle 2, a propeller 7 coaxially mounted at the forward end of nacelle 6 and driven by the engine 4, and an elongated propelling jet producing unit 8 spaced from the nacelles 2 and 6 in approximate parallel relation thereto and that unit 8 may comprise in coaxial relation an axial flow compressor 9 having high and low pressure discharge portions 11 and 12, respectively, an axial flow gas turbine 13 drivingly connected with the compressor 9, and an open-ended nacelle 14 surrounding and forming with the compressor 9 and turbine 13 a forwardly facing inlet 16 for the compressor and a rearwardly facing nozzle 17 for receiving and expanding the exhaust from the turbine.

A first conduit means, which may include inner and outer coaxial shell portions 18 and 19, respectively, a heat exchanger 21, and a pipe 22, conducts air from the compressor high pressure discharge portion 11 into the engine 1 and a second conduit means, which may comprise pipe 23 and inner and outer coaxial shell portions 24 and 26, respectively, conducts the exhaust from the engine 1 to the inlet of the turbine 13. A bypass conduit 27 may be provided for conducting a portion of the high pressure air directly into the second conduit means wherein it mixes with the exhaust from the engine 1 passing therethrough. The portion of the high pressure air flowing through conduit 27 may be used to either heat or cool the exhaust from the engine and in order to selectively obtain heating or cooling as desired, conduit 27 is preferably provided with a fuel distributing nozzle or burner 28. A rapid mixing of the engine exhaust with the heating or cooling air flowing through bypass conduit 27 may be attained by providing the junction of pipe 23 and bypass conduit 27 with a dispersion grid or the like 29 adapted to divide and combine in thin alternate layers the streams of cold or heated air and engine exhaust gas.

A third conduit means which may also include the inner and outer shell portions 18 and 19, respectively, a separate heat exchanger 37 and a pipe 38, conducts air from the compressor high pressure discharge portion 11 into the engine 4 and a fourth conduit means, which may comprise pipe 39 and the inner and outer shells 24 and 26, respectively, conducts the exhaust from engine 4 to the inlet of the turbine 13. A bypass conduit 41 may be provided for conducting a portion of the high pressure air into the fourth conduit means wherein it mixes with the exhaust from the engine 4 passing therethrough. Conduit 41 may be provided with a fuel distributing nozzle or burner 42 and the junction between conduit 41 and pipe 39 may be provided with a dispersion grid or the like 43 which is similar to and for the same purpose as stated with respect to the grid 29.

The nacelle 14 coacts and forms with the heat exchangers 21 and 37, with the outer shells 19 and 26 and with an intermediate shell 44, which connects the outer shells 19 and 26, a passage 46 for conducting the air from the compressor low pressure discharge portion 12 directly to the nozzle 17 wherein the exhaust from the turbine and the relatively cold low pressure air flowing through the passage 46 pass through a dispersion grid 47 which divides and combines the turbine exhaust and the relatively cold air streams in the nozzle in thin alternate layers in order to effect a rapid mixing of the streams therein. Preferably the inlet of the compressor and the rear end of the turbine are enclosed in coaxial casings 48 and 49, respectively, shaped to reduce air resistance and drag and to prevent the air and gas streams from eddying in the inlet 16 and nozzle 17, respectively.

Engine heat dissipating portions or radiators 51 and 52, which in this embodiment of the invention are necessarily spaced from rather than being formed as integral external part of the engines 1 and 4, respectively, are shown, for purposes of illustration only, as heat exchangingly associated with portions of the passage 46 in upstream relation to the heat exchangers 21 and 37 and as being connected by means of pairs of pipes 53, 54 and 56, 57 with the engines 1 and 4, respectively, for the circulation of cooling fluid therethrough. Cooling of the engine or portions thereof may be accomplished either in whole or in part and with or without the aid of a circulating fluid as herein shown the essential feature being that a heat dissipating portion of the engine or engines, which may be of any desired construction and either a part of the engine proper or an accessory thereto, is heat exchangingly associated with and cooled directly or indirectly by the flow of relatively cold air through the passage 46.

The operation of the power plant shown in Fig. 1 should be apparent from the foregoing description and in this connection, it should suffice to point out that the air is discharged from the compressor 9 in two separate streams of materially different pressures; the high pressure stream being used to supercharge the engine or engines, which may be of any desired type, and the low pressure stream being used separately or with other means to cool the engine in whole or in part and then expanded to produce a propelling jet. Utilizing separate engine supercharging and engine cooling streams at materially different pressures as herein disclosed increases the efficiency of the propelling jet producing unit and enables cooling of the engine or parts thereof to be effected with a relatively dense medium as compared to the pressure of the air entering the compressor and with a relatively cold medium as compared to the temperature of air compressed to a degree sufficient for engine supercharging purposes at high altitude. Therefore, in addition to eliminating the air drag inherently produced when cooling is effected solely by movement of the vehicle through the surrounding air, the use of a low positive pressure cooling stream in the type of power plant herein disclosed affords as much or more cooling action with heat exchanging or dissipating apparatus of less size and weight than can be obtained with the use of a high pressure supercharging air stream since although an increase in pressure is accompanied by an increase in stream velocity, the resulting increase in temperature more than offsets any advantage obtained by the increase in velocity. Consequently, the net result of cooling with a low positive pressure air stream is to effect a material reduction in the weight-power ratio and an increase in both the overall efficiency and the thrust effectiveness of the propelling jet or jets.

The modification shown in Fig. 2 illustrates an application of the invention to a power plant in which the exhaust from the internal combustion engine is only sufficient for operating a single propelling jet producing unit and in which the cooling capacity of the unit's low pressure air stream is insufficient to maintain the temperature of the engine or parts thereof less than a predetermined maximum.

However, this modification affords all of the advantages pointed out with respect to the power plant shown in Fig. 1 and is particularly applicable to existing engine structures, that is engine structures not designed especially for use with a propelling jet producing unit.

Referring to Fig. 2 of the drawings, it is seen that such a power plant may include an internal combustion engine 61, and elongated nacelle 62 substantially enclosing engine 61 and having its longitudinal axis disposed in the general direction of vehicle movement indicated by the captioned arrow, a propeller 63 coaxially mounted at the forward end of the nacelle 62 and driven by the engine 61 disposed within same, and a pair of elongated propelling jet producing units 64 and 66 spaced from the nacelle 62 in approximate parallel relation thereto and that each of said units may comprise in coaxial relation the same arrangement of elements as the unit 8 of Fig. 1, namely: an axial flow compressor 9 having high and low pressure discharge portions 11 and 12, respectively, an axial flow turbine 13, an open-ended nacelle 14 surrounding and forming with compressor 9 and turbine 13 a forwardly facing inlet 16 for the compressor and a rearwardly facing nozzle 17 for receiving and expanding the exhaust from the turbine, and the casings 48 and 49 enclosing the central front and rear end portions of the compressor and turbine, respectively.

Unit 64 embodies conduit means, which may include and be formed at least in part by the nacelle 14, an inner shell 67 and an intermediate shell 68, providing a first passage 69 for conducting air from the compressor high pressure discharge portion 11 to the inlet of the turbine and a second passage 71 for conducting air from the compressor low pressure discharge portion 12 directly to the nozzle 17 wherein the relatively cold low pressure air issuing from passage 71 and the turbine exhaust pass through the dispersion grid 47 in the manner and for the purpose specified in connection with the description of Fig. 1. In addition, any suitable means, such as a fuel distributing nozzle or burner 70, is provided for highly heating the high pressure air flowing through the passage 69.

Unit 66 is shown as embodying the same conduit means as does the unit 8 of Fig. 1, namely: a first conduit means comprising inner and outer coaxial shell portions 18 and 19, respectively, heat exchanger 21 and a pipe 22 for conducting air from the compressor high pressure discharge portion 11 into the engine 61; a second conduit means comprising pipe 23 and inner and outer coaxial shell portions 24 and 26, respectively, for conducting the exhaust from the engine 61 to the inlet of the turbine; a bypass conduit 27 for conducting a portion of the high pressure air directly into the second conduit means; a dispersion grid or the like 29 forming the junction between pipe 23 and bypass conduit 27; and a passage 46 formed by nacelle 14, heat exchanger 21, the outer shells 19 and 26, and by intermediate shell 44 for conducting air from the compressor low pressure discharge portion directly to the nozzle 17 in which the air and the exhaust from the turbine pass through the dispersion grid 47 for the purpose hereinbefore specified.

Engine 61 is provided with two heat dissipating portions or radiators 72 and 73, which in this embodiment of the invention are necessarily spaced from rather than being formed as integral external parts of the engine. Heat dissipating portion 72 is heat exchangingly associated with a portion of the passage 71 in unit 64 and portion 73 is, for purposes of illustration only, shown as heat exchangingly associated with a portion of the passage 46 in unit 66 in upstream relation to the heat exchanger 21 forming a part thereof. The portions 72 and 73 are connected with the engine 61 by means of pairs of pipes 53, 54 and 56, 57, respectively, for the circulation of cooling fluid therethrough. As previously stated with respect to engines 1 and 4, the cooling of engine 61 may be accomplished either in whole or in part and with or without the aid of a circulating fluid as herein shown simply by providing heat dissipating portions which may be either integral parts of the engine or accessories thereto and by disposing said portions in direct or indirect heat exchanging relation to the relatively cold low pressure air streams flowing through the passages 46 and 71. The operation of the modified power plant shown in Fig. 2 should also be apparent from the foregoing description and a further explanation in this connection is deemed unnecessary for a complete understanding of the invention.

The further modification shown in Fig. 3 is quite similar to that shown in Fig. 2, the only difference being that the exhaust from the internal combustion engine is sufficient to operate two propelling jet producing units and the low pressure air streams of two such units are required to cool the engine in whole or in part. Referring to the drawing, it is seen that this power plant may include an internal combustion engine 74, an elongated nacelle 76 substantially enclosing engine 74 and having its longitudinal axis disposed in the general direction of vehicle movement indicated by the captioned arrow, a propeller 77 coaxially mounted at the forward end of the nacelle 76 and driven by the engine 74, disposed within same, and a pair of similar elongated propelling jet producing units 78 and 79 spaced from the nacelle 76 in approximate parallel relation thereto, that each of said units is shown as being identical in both construction and operation to the unit 66 of Fig. 2, and that the cooling of engine 74 is accomplished by substantially the same means and in substantially the same manner as the cooling of engine 61 of Fig. 2.

Consequently, in the interest of simplicity the numerals applied in Fig. 2 to the heat dissipating portions of engine 61, to the elements of unit 66, to the conduit means connecting the compressor high and low discharge portions with the engine and nozzle, respectively, to the conduit means connecting the engine exhaust with the turbine inlet, and to the pairs of cooling fluid circulating pipes have been applied in Fig. 3 to the corresponding parts of the engine 74, the units 78 and 79 and the conduits and pipes interconnecting said engine and units.

Except for the fact that in Fig. 3 the high pressure air stream of unit 78 is used to supercharge the engine and the exhaust from the engine is delivered to the turbine whereas in Fig. 2 the high pressure air stream of unit 64 is heated within the unit, the operation of these two modified power plants is identical. Consequently, the operation of the power plant shown in Fig. 3 should be obvious and in this connection, it should suffice to point out that this power plant also affords all of the advantages particularly pointed out with respect to the power plant of Fig. 1.

Obviously, the power plants herein shown and described may be materially modified without departing from applicant's invention. For example, the number of internal combustion engines and the number of propelling jet producing units employed in a single power plant may be varied as desired and the engines and units employed may be grouped in a single nacelle or divided into engine and unit groups disposed in separate nacelles; the essential feature being that each such power plant includes at least one internal combustion engine and at least one propelling jet producing unit combined either in a single or separate nacelles to operate in the manner hereinbefore disclosed.

Accordingly, it should be understood that it is not intended to limit the invention to the exact constructions and arrangements herein shown and described solely for purposes of illustration as various modifications within the scope of the appended claims may occur to persons skilled in the art.

It is claimed and desired to secure by Letters Patent:

1. A vehicle power plant comprising a fluid cooled internal combustion engine adapted to drive a coaxially disposed vehicle-propelling element, an elongated nacelle substantially enclosing said engine and having its longitudinal axis disposed in the general direction of vehicle movement, a first elongated propelling jet producing unit spaced from said nacelle in approximate parallel relation thereto and including in coaxial relation a gas turbine, a compressor driven by the turbine and having high and low pressure discharge portions, and an open-ended nacelle surrounding and forming with said compressor and turbine a forwardly facing inlet for the compressor and a rearwardly facing nozzle for receiving and expanding the exhaust from the turbine, means forming within the open-ended nacelle of said first unit separate passages for conducting air from the high pressure discharge portion of its compressor to the inlet of its turbine and air from the low pressure discharge portion of its compressor directly to its nozzle, means within said open-ended nacelle for heating the high pressure air flowing into the turbine of said first unit, conduit means for conducting engine cooling fluid in heat exchanging relation to the relatively cold low pressure air flowing directly to the nozzle of said first unit, a second elongated propelling jet producing unit spaced from said nacelles in approximate parallel relation thereto and also including in coaxial relation a gas turbine, a compressor driven by the turbine and having high and low pressure discharge portions, and an open-ended nacelle surrounding and forming with said compressor and turbine a forwardly facing inlet for its compressor and a rearwardly facing nozzle for receiving and expanding the exhaust from its turbine, a first conduit means for conducting air from the high pressure discharge portion of the compressor of said second unit into said engine, a second conduit means for conducting the exhaust from said engine to the inlet of the turbine of said second unit, means forming a passage within the open-ended nacelle of said second unit for conducting air discharged from the low pressure discharge portion of its compressor directly to its said nozzle, and additional conduit means for circulating engine cooling fluid in heat exchanging relation to the cold low pressure air confining passage in said second unit.

2. A vehicle power plant comprising a fluid cooled internal combustion engine adapted to drive a vehicle-propelling element, a first propelling jet producing unit spaced from said engine and including a gas turbine, a compressor driven by the turbine and having high and low pressure discharge portions, and a rearwardly facing nozzle for receiving and expanding the exhaust from its turbine, means forming a passage for conducting air from the low pressure discharge portion of the compressor of said first unit directly to its nozzle, a second propelling jet producing unit spaced from said engine and first unit and also including a gas turbine, a compressor driven by the turbine and having high and low pressure discharge portions and a rearwardly facing nozzle for receiving and expanding the exhaust from its said turbine, a first conduit means for severally conducting air from the high pressure discharge portions of said compressors into said engine, a second conduit means for severally conducting the exhaust from said engine to the inlets of the turbines of said first and second units, means forming a passage for conducting air from the low pressure discharge portion of the compressor of said second unit directly to its said nozzle, and a third conduit means for severally conducting engine cooling fluid in heat exchanging relation to the cold low pressure air confining passages of said first and second units.

3. A vehicle power plant comprising a fluid cooled internal combustion engine adapted to drive a vehicle-propelling element, a first jet propelling unit spaced from said engine and including a gas turbine, a compressor driven by said turbine and having high and low pressure discharge portions, and a rearwardly facing nozzle for receiving and expanding the exhaust from said turbine, means forming separate passages for severally conducting air from the high pressure discharge portion of the compressor of said first unit to the inlet of its turbine and air from the low pressure discharge portion of said compressor directly to said nozzle, means for heating the high pressure air flowing into the turbine of said first unit, conduit means for conducting engine cooling fluid in heat exchanging relation to the relatively cold low pressure air flowing directly to the nozzle of said first unit, a second jet producing unit spaced from said engine and first unit and including a gas turbine, a compressor driven by said turbine and having high and low pressure discharge portions, and a rearwardly facing nozzle for receiving and expanding the exhaust from its said turbine, a first conduit means for conducting air from the high pressure discharge portion of the compressor of said second unit into said engine, a second conduit for conducting the exhaust from said engine to the inlet of the turbine of said second unit, means forming a passage for conducting air discharged from the low pressure discharge portion of the compressor of said second unit directly to its said nozzle, and additional conduit means for circulating engine cooling fluid in heat exchanging relation to the cold low pressure air confining passage of said second unit.

4. A vehicle power plant comprising a fluid cooled internal combustion engine adapted to drive a vehicle-propelling element, a first jet producing unit spaced from said engine and including a gas turbine, a compressor driven by said turbine and having discharge outlet means, and a rearwardly facing nozzle for receiving and expanding the exhaust from said turbine, means for conducting a portion of the air from said discharge outlet means of the compressor of said first unit to the inlet of its turbine, second means for conducting a portion of the air from said discharge outlet means to said nozzle, means for heating the air flowing into the turbine of said first unit, conduit means for conducting engine cooling fluid in heat exchanging relation to the air in said second conducting means, a second jet producing unit spaced from said engine and first unit and including a gas turbine, a compressor driven by said turbine and having high and low pressure discharge portions, and a rearwardly facing nozzle for receiving and expanding the exhaust from its turbine, a first conduit means for conducting air from the high pressure discharge portion of the compressor of said second unit into said engine, a second conduit means for conducting the exhaust from said engine to the inlet of the turbine of said second unit, means forming a passage for conducting air discharged from the low pressure discharge portion of the compressor of said second unit directly to its said nozzle, and additional conduit means for circulating engine cooling fluid in heat exchanging relation to the cold low pressure air confining passage of said second unit.

5. A vehicle power plant comprising a fluid cooled internal combustion engine adapted to drive a vehicle-propelling element, a first jet producing unit spaced from said engine and including a gas turbine, a compressor driven by said turbine and having discharge outlet means, and a rearwardly facing nozzle for receiving and expanding the exhaust from said turbine, means for conducting a portion of the air from said discharge outlet means of the compressor of said first unit to the inlet of its turbine, second conducting means for conducting a portion of the air from said discharge outlet means to said nozzle, means for heating the air flowing into the turbine of said first unit, conduit means for conducting engine cooling fluid in heat exchanging relation to the air in said second conducting means, a second jet producing unit spaced from said engine and first unit and including a gas turbine, a compressor driven by said turbine and having high and low pressure discharge portions, and a rearwardly facing nozzle for receiving and expanding the exhaust from its turbine, a first conduit means for conducting air from the high pressure discharge portion of the compressor of said second unit into said engine, a second conduit means for conducting the exhaust from said engine to the inlet of the turbine of said second unit, a bypass conduit for conducting part of the air discharged from said high pressure portion of said second unit into said second conduit means to mix therein with the exhaust from said engine, and means for selectively heating the high pressure air flowing through said bypass conduit.

6. A vehicle power plant comprising a fluid cooled internal combustion engine adapted to drive a vehicle-propelling element, a first propelling jet producing unit spaced from said engine and including a gas turbine, a compressor driven by said turbine and having high and low pressure discharge portions, and a rearwardly facing nozzle for receiving and expanding the exhaust from its turbine, means forming a passage for conducting air from the low pressure discharge portion of the compressor of said first unit directly to its said nozzle, a second propelling jet producing unit spaced from said engine and first unit and also including a gas turbine, a compressor driven by said turbine and having high and low pressure discharge portions, and a rearwardly facing nozzle for receiving and expanding the exhaust from said turbine, a first conduit means for severally conducting air from the high pressure discharge portions of said compressors into said engine, a second conduit means for severally conducting exhaust from said engine to the inlets of the turbines of said first and second units, means forming a passage for conducting air from the low pressure discharge portion of the compressor of said second unit directly to its said nozzle, and a third conduit means for severally conducting engine cooling fluid in heat exchanging relation to the cold low pressure air confining passages of said first and second units, bypass conduit means for conducting a part of the air flowing through said first conduit means into said second conduit means for mixture therein with the exhaust gas flowing therethrough, and means for selectively heating at least some of the air flowing through said bypass conduit means.

JOHN ALGOT JOHNSON.

REFERENCES CITED

The following references are of record in the file of this patent:

UNITED STATES PATENTS

| Number | Name | Date |
|---|---|---|
| 2,128,789 | Anxionnaz | Aug. 30, 1938 |
| 2,159,758 | Diedrich | May 23, 1939 |
| 2,163,357 | Spencer | June 20, 1939 |
| 2,356,557 | Anxionnaz et al. | Aug. 22, 1944 |
| 2,379,455 | Prince | July 3, 1945 |
| 2,411,227 | Planiol et al. | Nov. 19, 1946 |

FOREIGN PATENTS

| Number | Country | Date |
|---|---|---|
| 454,266 | Great Britain | Sept. 28, 1936 |
| 513,751 | Great Britain | Oct. 20, 1939 |
| 538,022 | Great Britain | July 17, 1941 |
| 544,940 | Great Britain | May 4, 1942 |
| 360,880 | Germany | Dec. 17, 1919 |